United States Patent [19]

Hummel

[11] Patent Number: 5,414,975
[45] Date of Patent: May 16, 1995

[54] FOOTWEAR PACKAGING AND METHOD

[75] Inventor: Bernd Hummel, Pirmasens, Germany

[73] Assignee: Bernd Hummel GmbH, Pirmasens, Germany

[21] Appl. No.: 99,341

[22] Filed: Jul. 30, 1993

[30] Foreign Application Priority Data

Jul. 30, 1992 [DE] Germany .................. 42 25 232.6

[51] Int. Cl.⁶ .................. B65B 5/04; B65B 25/20; A45C 3/00
[52] U.S. Cl. .................. 53/432; 12/114.4; 53/434; 53/472; 206/287; 206/522
[58] Field of Search .......... 53/472, 434, 432, 512, 53/510, 467, 468, 469, 413, 411, 134.1; 206/522, 814, 287, 286, 288, 296, 278, 279, 281; 12/114.4, 128 R, 133 R

[56] References Cited

U.S. PATENT DOCUMENTS

| 3,891,082 | 6/1975 | Fall | 206/522 X |
| 4,905,835 | 3/1990 | Pivert et al. | 206/522 |
| 4,918,904 | 4/1990 | Pharo | 53/472 |

FOREIGN PATENT DOCUMENTS

| 297998 | 10/1928 | United Kingdom | 12/114.4 |
| 433294 | 1/1935 | United Kingdom | 12/114.4 |
| 639746 | 12/1948 | United Kingdom | 12/114.4 |

Primary Examiner—James F. Coan
Attorney, Agent, or Firm—Lowe, Price, LeBlanc & Becker

[57] ABSTRACT

Above-ambient pressure is applied by bladders to internal surfaces of a pair of footwear articles to stretch the footwear and prevent deformation during shipping and handling. A protective wrapper forming a gas-impermeable sealed case surrounding the pair of footwear articles abuts external surfaces of the footwear articles. The case has an internal pressure less than ambient pressure.

20 Claims, 3 Drawing Sheets

FOOTWEAR PACKAGING AND METHOD

FIELD OF INVENTION

The present invention relates to packaging for footwear, and more particularly to footwear packaging wherein the footwear is internally pressurized and externally wrapped and to a method of performing such packaging.

BACKGROUND ART

Footwear, e.g., shoes, sandals, boots, slippers, etc. but not socks, frequently is packaged for transport and sale in a box. The footwear is usually wrapped with an appropriate paper sheet and another sheet is stuffed in each footwear article to prevent undesired footwear deformation inside the box. The prior art footwear box requires significant space, which is especially disadvantageous during shipping.

To overcome this problem, the prior art has used pouches or jute bags for footwear packaging. In this arrangement, 10-20 pairs of shoes are tightly fitted in cardboard during shipping. However, these pouches or jute bags lack a rigid shape so the shoes shipped therein are not protected against deformation. Moreover, repackaging into the conventional shoe cartons is frequently necessary when the shoes are removed from the jute bag, prior to sale to the end consumer. Aside from the above disadvantageous bulk, the prior art shoe cartons pose ecological problems because of the large amounts of packaging refuse.

Therefore, it is an object of the present invention to provide a new and improved footwear packaging structure and method.

Another object is to provide a new and improved footwear packaging structure and method wherein the packaged footwear is protected against damage during storage and shipping, which is more compact and at the same time allows lower use of packing materials, and which results in reduced labor in packing.

A further object of the present invention is to provide a new and improved. footwear packaging structure and method wherein the footwear is preserved against damage while so packaged so it reaches the end consumer undamaged and is packaged so practical handling is assured in commerce.

DISCLOSURE OF THE INVENTION

In accordance with one aspect of the invention, above-ambient pressure is applied to internal surfaces of a pair of footwear articles, and a wrapper abuts external surfaces of the pair of footwear articles. The pressure is preferably applied by a bladder to stretch and prevent deformation of the footwear articles. In a preferred embodiment, the wrapper is a gas-impermeable sealed case surrounding the pair of footwear articles and has an internal pressure less than ambient.

The invention obviates the need to use paper to stuff the footwear while protecting the footwear from deformation.

In a preferred embodiment, the pressurizing means and outer wrapper are integral in such a manner that the bladders matching the inside shape of the footwear can be inserted into these footwear and the outer wrapper can then enclose this assembly.

A further aspect of the invention is that the bladders are internally pressurized in common via a single valve, e.g., by an air pump. After the bladders have been pressurized, the fitted bladders hug the insides of the footwear they protect against deformation which might arise, for instance, if an external force were applied to the footwear during shipping.

Significantly, in this invention, the outer wrapper can be pulled over the footwear following such pressurization and sealed by welding. Vacuum welding in particular is appropriate, whereby the footwear is especially well-protected against the environment.

The outer wrapper and/or the bladders are preferably made of reprocessable plastic, resulting in a substantial reduction of the amount of used packing material. The packaging of the invention already can be put in place by footwear manufacturer to eliminate repackaging work incurred with known footwear packaging.

The space required for shipping and/or storage is effectively reduced by eliminating the prior art footwear cartons.

In a preferred mode of the invention, the outer wrapper is transparent to allow visual inspection of footwear inside the wrapper. Thereby, the previously required procedure of unpacking and repacking the footwear is obviated when prospective customers wish to examine the footwear for external defects. This is also advantageous when shipping footwear packed in such manner because visual examination provides information of the footwear in the packaging.

A board for receiving arbitrary written information is provided on the outer wrapper, preferably at one of its ends. Advantageously, this board or writing substrate is formed of cardboard and/or paper integrated into and/or clamped onto the outer wrapper. This writing substrate serves as a label for selling purposes and as a support for an article-numeral or an electronic data processing readable code or the like during shipping or storage.

The outer wrapper also preferably includes a suspension aperture and/or a clip in the zone of the writing substrate, whereby footwear packed in such manner may be hung up in storage.

Advantageously, the inflated bladders act as a stretching system that can be used as shoe stuffers after the outer wrapper has been removed. In other words, these bladders may replace the known shoe stretchers or trees for use by retailers or end consumers.

Consequently, the packaging of the invention offers the advantage of more compactness both in storage and during shipping than is the case for the known footwear carton. Moreover, less labor is required because repacking from packaging by the manufacturer to the end-consumer packaging is eliminated.

The pair of footwear articles arranged in the packaging of the invention is protected during shipping by the pressurized bladders against external, pressure-induced deformations and by the outer wrap against damage, soiling, etc. Since the packaging is preferably reprocessable plastic, ecological waste management is enhanced.

In accordance with a further aspect of the invention, a pair of footwear article is packaged by inserting a bladder in each article forming the pair of footwear articles. Each inserted bladder is inflated so it applies above-ambient pressure to internal surfaces of the footwear article into which it is inserted. The inflated bladder is sealed. A wrapper is applied against external surfaces of the footwear articles forming the pair. Preferably, the wrapper is a gas-impermeable case surrounding the pair of footwear articles. The pressure in the case is removed and sealing the case is sealed with the reduced pressure therein. The bladders are used as stiffeners for the footwear after the wrapper has been removed.

The above and still further objects, features and advantages of the present invention will become apparent upon consideration of the following detailed descriptions of several specific embodiments thereof, especially when taken in conjunction with the accompanying drawings.

BEST MODE FOR CARRYING OUT THE INVENTION

Figure 1:
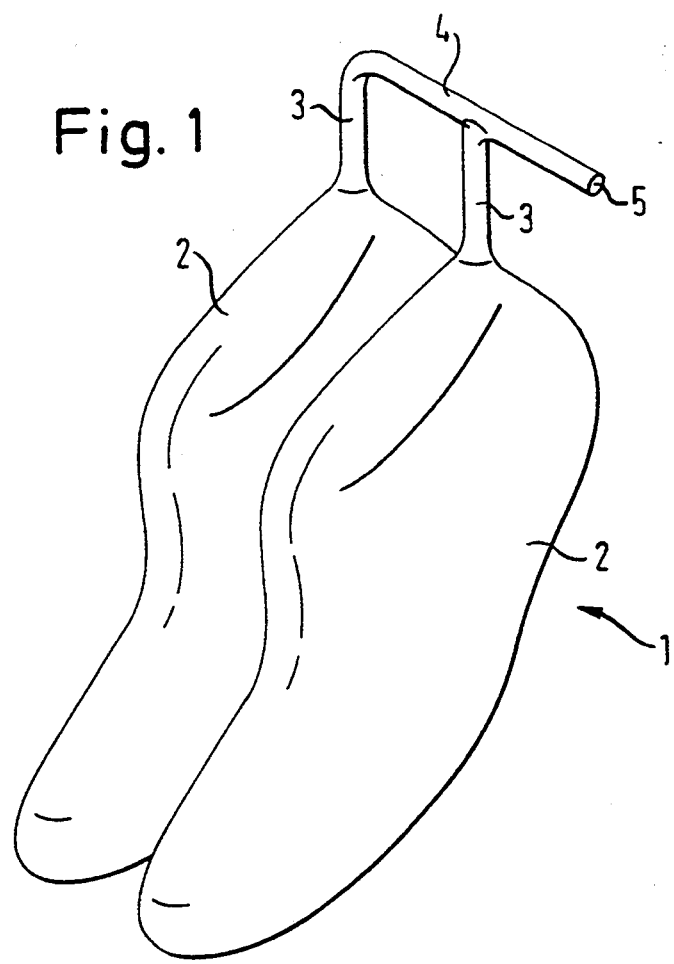
FIG. 1 is a schematic perspective view of two bladders forming chambers which can be internally pressurized as part of a first embodiment of the packaging of the invention.

As shown in FIG. 1 of the drawing, stretching system 1 to be mounted inside the footwear, e.g., shoes, boots or the like, comprises two inflatable bladders 2, each forming a chamber designed to match a footwear article. Hence, the exterior surfaces of different bladders 2 have different shapes, depending on and substantially matching the inner shape of the footwear article into which the chamber is to be inserted. Tubular line 3, connected in a fluid-tight relation between a heel portion of each bladder 2, is connectable to a suitable gas pressurizing source for supplying gas to the chamber within each bladder. Lines 3 are each integral with the bodies of bladders 2 and are connected at their ends to line 4 leading away from the bladders. Aperture 5, at the end of line 4, is connected, e.g., to a pump feeding a suitable, pressurized gas, for instance air, to bladders 2. Gas is selectively fed into or evacuated from bladders 2 through aperture 5.

Figure 2:
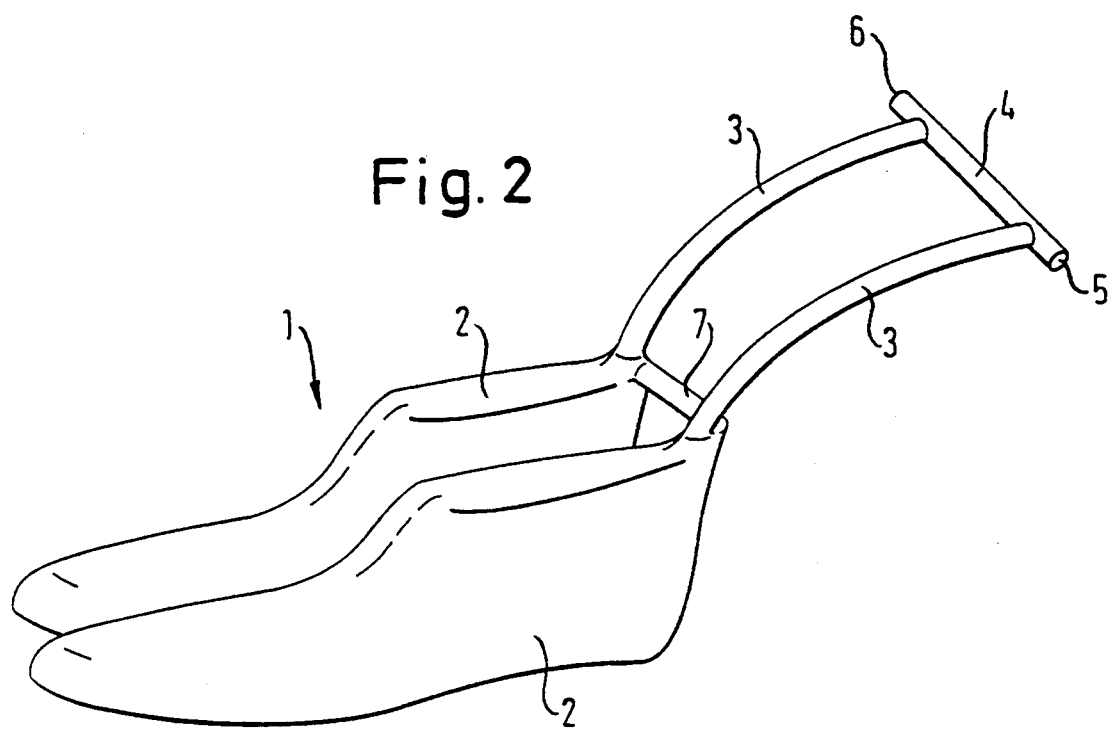
FIG. 2 is a schematic perspective view of two chambers in a second embodiment.

In the variational embodiment mode of bladders 2 shown in FIG. 2, a communication line 7 is additionally provided at heel zones of bladders 2 to ensure pressure balance between the chambers formed in the bladders. Moreover, system 1 as illustrated in FIG. 2 comprises a further aperture 6 in line 4 opposite aperture 5. Therefore, gas can be selectively fed through or evacuated out of bladders 2 via apertures 5 and 6. At the same time or instead, the same alternatively pressurizing gas can be supplied through aperture 5 to inflate bladders 2 and after the packaging has been used, the gas can be evacuated through aperture 6.

Figure 3:
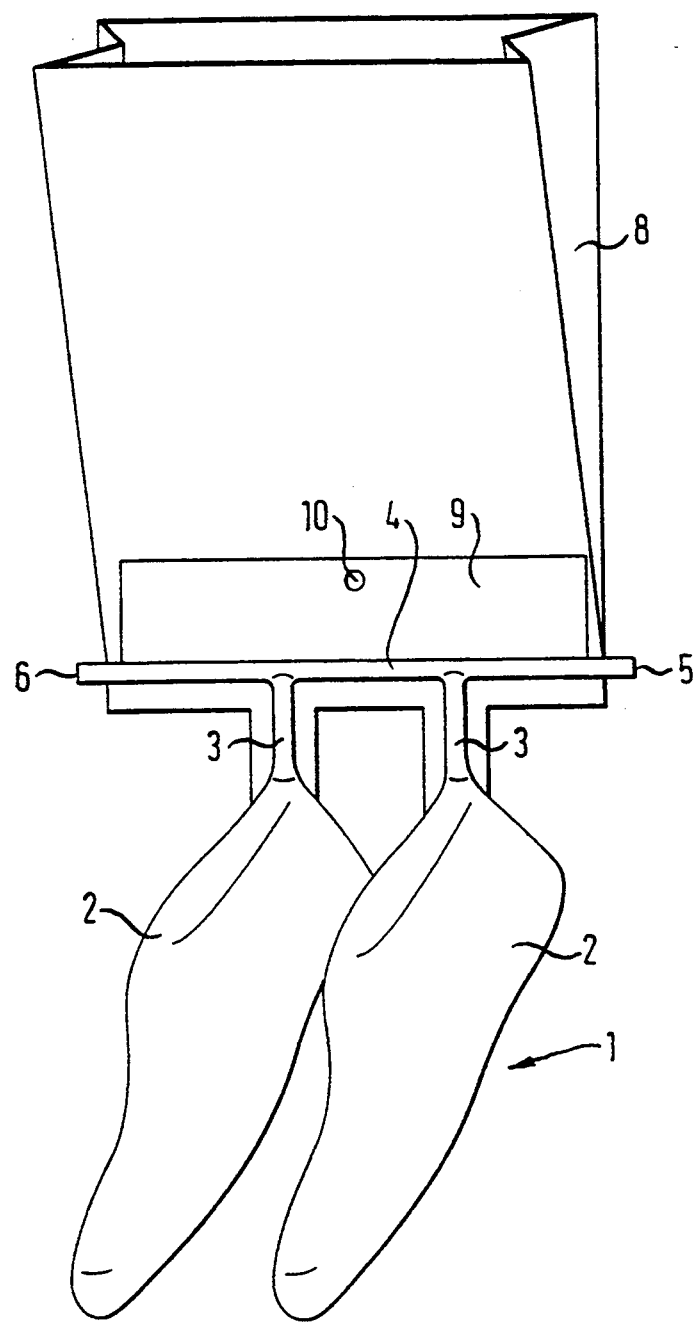
FIG. 3 is a schematic perspective view of the packaging with the outer wrapper and the chambers.

The packaging shown in FIG. 3 comprises the already described bladders 2, optically-transparent, gas-impermeable outer wrapper 8, e.g., made of polyethylene, serving as outer packing that surrounds and abuts some of the exterior surfaces of shoes 11. One end of outer wrapper 8 is mounted to apertures 5, 6 so filling aperture 5 and evacuating aperture 6 are externally accessible. Outer wrapper 8 has a free open end and has the general shape of a pouch. Writing substrate 9 is mounted at the junction between stretching or pressurizing system 1 and outer wrapper 8. Substrate 9 is formed of cardboard and/or paper and receives writing required for storage or final sale whereby constant monitoring or rearrangement of the packed shoes is easily provided.

As further shown by FIG. 3, suspension aperture 10 is provided centrally of writing substrate 9 so the packaging with the shoes arranged therein can be stored in a hanging manner; thereby, the space required for storage is considerably reduced relative to the prior art.

Figure 4:
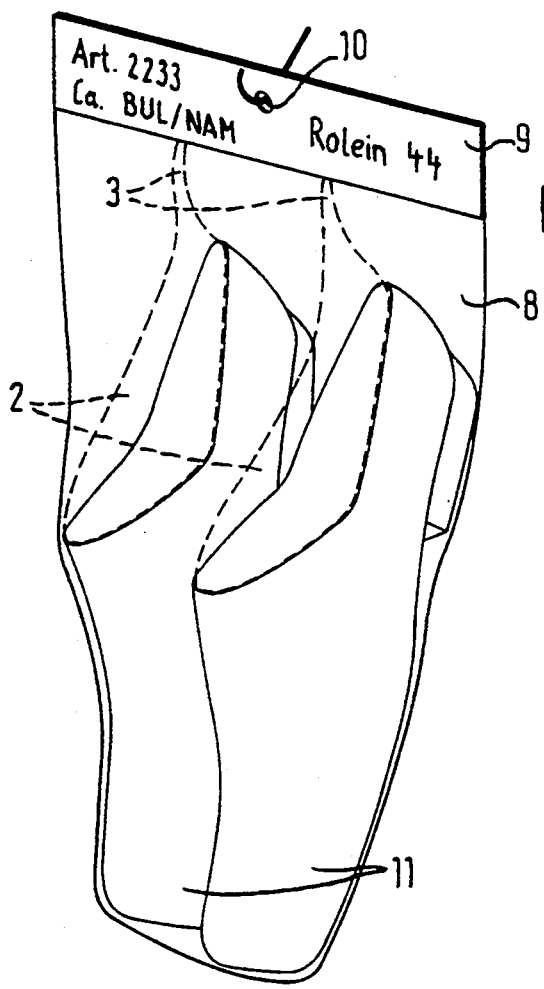
FIG. 4 is a perspective view of the packaging in its operational condition with shoes located therein.

In FIG. 4, the packaging is illustrated in an operative state in which shoes 11 are located inside sealed outer wrapper 8; the interior of wrapper 8 is at less than ambient atmospheric pressure. A pressurized bladder 2 is located inside each of shoes 11. As a result, shoes 11 are preserved against deformation, for instance arising in shipping, on one hand, and on the other hand, they are protected against external damaging effects such as dust, etc.

Bladders 2 of the stretching system 1 shown in FIG. 3 are inserted into shoes 11 of FIG. 4 and then are loaded with air through the apertures 5 or 6 in such a way that exterior walls of the bladders snugly press against the inside walls of shoes 11. Thereupon, the outer wrapper 8 is pulled downward out of the position shown in FIG. 3 over shoes 11 and pressurized bladders 2. Wrapper 8 is then sealed to a subatmospheric pressure, for instance by vacuum welding, whereby the packaging state shown in FIG. 4 is achieved.

While outer wrapper 8 is being pulled over shoes 11, writing substrate 9 is freed from the zone of influence of outer wrapper 8 so the substrate is freely exposed outside of wrapper 8, enabling the packaged shoes to be suspended from suspension aperture 10.

Figure 5:
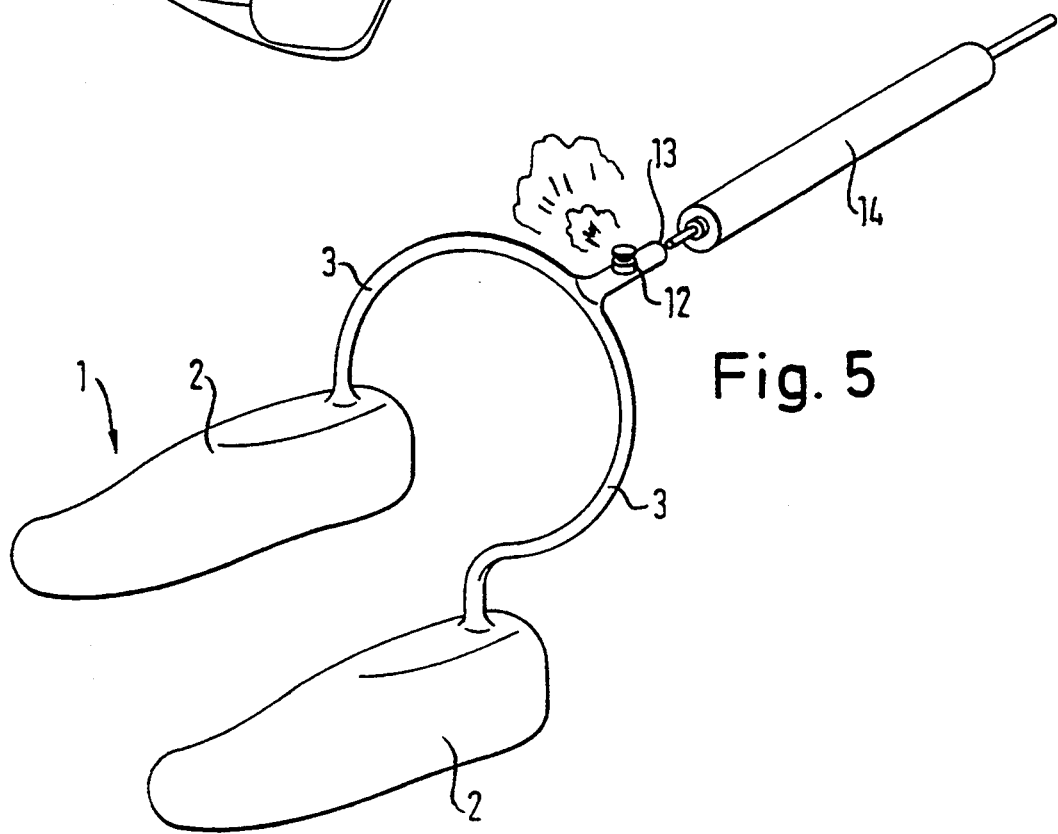
FIG. 5 is a perspective view of the packaging of a third embodiment.

Valve 12 is provided in the variational embodiment mode of the system 1 shown in FIG. 5 in a communication site between lines 3 of bladders 2. Bladders 2 are air-loaded by a symbolically-shown pump 14 through aperture 13 near valve 12 or by any other suitable arrangement. The air or gas so introduced into bladders 2 can also be let out again through valve 12. Therefore, once outer wrapper 8 has been removed, bladders 2 can then be used arbitrarily often as shoe stuffers, i.e., as shoe stretchers or trees.

Figure 6:
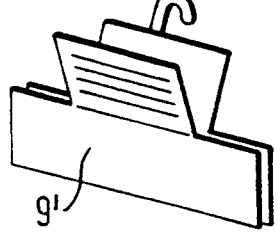
FIG. 6 is a perspective view of a clamp-on writing substrate for some of the embodiments.

The variational writing substrate 9' of FIG. 6 is designed like a clamp. This clamp-like writing substrate 9' can be used in lieu of writing substrate 9 of FIG. 4 in such a manner that following the sealing of outer wrapper 8, substrate 9' is mounted to the end of wrapper 8 facing the heel portion of shoes 11. Suspension clip 15 on writing substrate 9' replaces suspension aperture 10, enabling the packaging and shoes 11 inside thereof to be stored in a hanging manner.

While there have been described and illustrated specific embodiments of the invention, it will be clear that variations in the details of the embodiments specifically illustrated and described may be made without departing from the true spirit and scope of the invention as defined in the appended claims.

I claim:

1. A method of packaging a pair of footwear articles comprising inserting a bladder in each article forming the pair of footwear articles, inflating each inserted bladder so it applies above-ambient pressure to internal surfaces of the footwear article into which it is inserted, sealing the inflated bladder, and applying a wrapper against external surfaces of the footwear articles forming the pair, the wrapper being a gas-impermeable case surrounding the pair of footwear articles, reducing the pressure in the case, and sealing the case with the reduced pressure therein.

2. The method of claim 1 comprising inserting a bladder in each article forming the pair of footwear articles, inflating each inserted bladder so it applies above-ambient pressure to internal surfaces of the footwear article into which it is inserted, sealing the inflated bladder, and applying a wrapper against external surfaces of the footwear articles forming the pair, using the bladders as stiffeners for the footwear after the wrapper has been removed.

3. In combination, a pair of footwear articles, means applying above ambient-pressure to internal surfaces of the pair of footwear articles, and a wrapper abutting external surfaces of the pair of footwear articles, the wrapper being a gas-impermeable sealed case surrounding the pair of footwear articles, the case having an internal pressure less than ambient pressure.

4. The combination of claim 3 wherein the pressure applying means includes a bladder.

5. The combination of claim 4 wherein the bladders are connected in fluid flow relation to a common fluid conducting line.

6. The combination of claim 4 further including a valve in a line between an aperture leading to a pressurizing source and the bladders.

7. The combination of claim 3 wherein the applying means and wrapper are integral with each other.

8. The combination of claim 3 wherein the wrapper is formed of reprocessable plastic.

9. The combination of claim 3 wherein the wrapper is formed of optically transparent material.

10. The combination of claim 4 wherein the bladder has an external pressurized shape corresponding with the internal shape of the footwear articles.

11. In combination, a pair of footwear articles, means applying above ambient-pressure to internal surfaces of the pair of footwear articles, and a wrapper abutting external surfaces of the pair of footwear articles, one end of the wrapper including a substrate carrying indicia.

12. The combination of claim 11 wherein the wrapper includes a suspension clip in the region of the substrate.

13. The combination of claim 11 wherein the wrapper includes a suspension aperture in the region of the substrate.

14. Packaging for a pair of footwear articles comprising means for applying above-ambient pressure to internal surfaces of the pair of footwear articles, and a wrapper for abutting external surfaces of the pair of footwear articles, the wrapper being a gas-impermeable sealed case for surrounding the pair of footwear articles, and having an internal pressure less than ambient pressure.

15. The packaging of claim 14 wherein the pressure applying means includes a bladder.

16. The packaging of claim 15 wherein the bladder has an external pressurized shape corresponding with the internal shape of the footwear articles.

17. The packaging of claim 15 wherein the bladders are connected in fluid flow relation to a common fluid conducting line.

18. The packaging of claim 15 further including a valve in a line between an aperture leading to a pressurizing source and the bladder.

19. The packaging of claim 14 wherein the applying means and wrapper are integral with each other.

20. A method of packaging a pair of footwear articles comprising inserting a bladder in each article forming the pair of footwear articles, inflating each inserted bladder so it applies above-ambient pressure to internal surfaces of the footwear article into which it is inserted, sealing the inflated bladder, and applying a wrapper against external surfaces of the footwear articles forming the pair, using the bladders as stiffeners for the footwear after the wrapper has been removed.

* * * * *